United States Patent [19]

Ikeda et al.

[11] 4,448,837

[45] May 15, 1984

[54] PRESSURE-SENSITIVE CONDUCTIVE ELASTIC SHEET

[75] Inventors: Eiichi Ikeda, Hatano; Ikuo Kayama, Tama; Masahiro Izaki, Kawasaki, all of Japan

[73] Assignee: Oki Densen Kabushiki Kaisha, Kanagawa, Japan

[21] Appl. No.: 399,695

[22] Filed: Jul. 19, 1982

[51] Int. Cl.³ .................... B32B 7/02; B05D 3/14; C09J 7/02
[52] U.S. Cl. ..................... 428/215; 178/17 B; 178/18; 340/347 P; 427/47; 427/48; 428/323; 428/329; 428/900; 428/913; 428/914
[58] Field of Search ............ 428/913, 914, 900, 215, 428/323, 329; 178/18, 17 B; 200/46; 340/347 P; 427/47, 48

[56] References Cited

U.S. PATENT DOCUMENTS

| | | | |
|---|---|---|---|
| 3,590,158 | 6/1971 | Pabst | 178/18 |
| 3,624,619 | 11/1971 | Ambrosio | 178/17 B |
| 4,292,261 | 9/1981 | Kotani et al. | 264/24 |

FOREIGN PATENT DOCUMENTS

| | | | |
|---|---|---|---|
| 054406 | 6/1982 | European Pat. Off. | |
| 53-897 | 1/1978 | Japan | 428/900 |
| 53-1889 | 1/1978 | Japan | 428/900 |
| 54-146873 | 11/1979 | Japan | 428/900 |
| 56-22585 | 5/1981 | Japan | 428/900 |

Primary Examiner—Thomas J. Herbert, Jr.
Attorney, Agent, or Firm—Lowe, King, Price & Becker

[57] ABSTRACT

A pressure-sensitive, conductive elastic sheet for use in a graphics digitizing tablet through which various letters or figures can be detected, the characteristics of which are such that the contact pressure is almost constant irrespective of contact area or increases with increasing contact area. The pressure-sensitive sheet according to the present invention comprises a silicon rubber in which a number of coarse, ferromagnetic, conductive metal particles with a diameter of 30 to 150 micron are mixed with a number of fine, ferromagnetic, conductive metal particles with a diameter of 10 micron or less or 50 micron or less at a predetermined proportion in such a manner that the coarse particles are aligned vertically through the interior thereof and the fine particles are dispersed near at least one surface thereof. To properly align the particles, the sheet is allowed to set within a uniform magnetic field.

10 Claims, 4 Drawing Figures

PRESSURE-SENSITIVE CONDUCTIVE ELASTIC SHEET

BACKGROUND OF THE INVENTION

1. Field of the Invention

The present invention relates generally to a pressure-sensitive, conductive elastic sheet and particularly to a pressure-sensitive, conductive elastic sheet sandwiched between a pair of flat electrode plates, each having a group of straight strip electrodes which is used as a graphics digitizing tablet through which various letters or figures can be detected two-dimensionally by a character reader.

2. Description of the Prior Art

Pressure-sensitive, conductive elastic sheets are well-known. Elastic sheets of this kind is usually used in graphics digitizing tablets, which detect various letters or figures written thereon with a pen or the like. Such sheets are sandwiched between a pair of flat electrode plates provided with a group of straight strip electrodes in such a way that the strip electrodes on one flat electrode plate intersect those on the other flat electrode plate to form a matrix of points. In such a graphics digitizing tablet when pressure is applied to the pressure-sensitive conductive sheet via the upper and lower flat electrode plates, the conductive sheet makes electrical contact at points where pressure is applied by a pen and the contact points are digitized by the two perpendicular strip electrodes on the basis of co-ordinates. The surface area of the tablet on which letters or figures are written is relatively large, ranging from 100 mm square to 400 mm square. Accordingly, when some letters or figures are written on the tablet with a pen held in the user's hand, the heel of user's hand or the user's forearm inevitably depresses the surface of the tablet, with the result that erroneous operation often occurs in detecting the letters or figures. In this connection, experiment indicates that contact pressure (under which some of the upper strip electrodes are connected electrically to some of the lower strip electrodes) conventionally decreases with increasing contact area (throughout which some of the upper strip electrodes are connected electrically to some of the lower strip electrodes).

In other words, the upper and lower strip electrodes are easily connected electrically when light pressure is applied over a large conduction area on the tablet. To explain in more detail, when a pen is placed onto the tablet to write some letters, since the contact area is small, a relatively great contact pressure is needed to connect the upper and lower strip electrodes; on the other hand when the heel of the user's hand or the user's forearm is placed on the tablet, since the contact area is large, a relatively small contact pressure easily connects the upper and lower strip electrodes, thus resulting in erroneous operation.

A more detailed description of the prior-art pressure-sensitive, conductive elastic sheet for use in digitizing tablets will be described hereinafter with reference to the attached drawings in conjunction with the present invention under DETAILED DESCRIPTION OF THE PREFERRED EMBODIMENTS.

SUMMARY OF THE INVENTION

With these problems in mind therefore, it is the primary object of the present invention to provide a pressure-sensitive, conductive elastic sheet provided with the characteristics that the contact pressure under which electrical contact is made through the sheet is constant or increases with increasing contact area.

To achieve the above-mentioned object, the pressure-sensitive, conductive elastic sheet according to the present invention comprises a laminar elastomer in which a great number of coarse ferromagnetic, conductive metal particles with a diameter of 30 to 150 micron are mixed with a great number of fine ferromagnetic, conductive metal particles with a diameter of 10 micron or less (or 50 micron or less) in a predetermined proportion in such a way that the coarse particles are aligned perpendicular to the plane of the sheet and separated slightly from its surfaces and the fine particles are dispersed near at least one surface of the sheet.

To form the pressure-sensitive, conductive elastic sheet according to the present invention, first, coarse ferromagnetic, conductive metal particles are mixed with a liquid-state elastomer; secondly, the mixed material is formed into an inner sheet within a uniform magnetic field; thirdly, fine ferromagnetic, conductive metal particles are mixed with another liquid elastomer; fourthly, the liquid elastomer including fine particles is laminated onto both of the surfaces of the inner sheet including the coarse particles. Additionally, in another method, firstly, coarse ferromagnetic, conductive metal particles are coated with a low-molecular weight elastomer; secondly, the coated coarse particles are mixed with the fine ferromagnetic, conductive metal particles in a liquid elastomer; thirdly, the mixed material is allowed to set or cure within a uniform magnetic field for a predetermined time period.

BRIEF DESCRIPTION OF THE DRAWINGS

The features and advantages of the pressure-sensitive, conductive elastic sheet according to the present invention will be more clearly appreciated from the following description taken in conjunction with the accompanying drawings in which.

DETAILED DESCRIPTION OF THE PREFERRED EMBODIMENTS

To facilitate understanding of the present invention, brief reference will be made to a prior-art pressure-sensitive, conductive elastic sheet with respect to its application to a graphics digitizing tablet.

As is well-known, pressure-sensitive, conductive elastic sheets are used for graphics digitizing tablets which can detect various letters and figures written thereon with a pen or the like on the basis of rectangular co-ordinates and input the detected signals indicative of the co-ordinates to a character reader.

Figure 1:
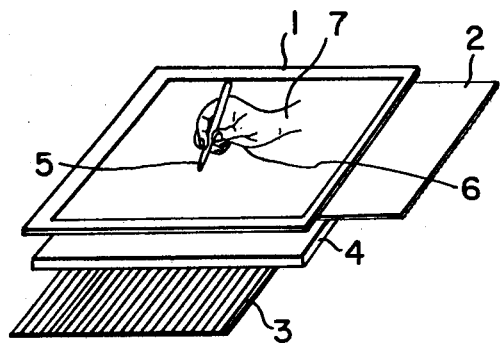
FIG. 1 is a pictorial perspective view showing a typical graphics digitizing tablet for assistance in explaining the present invention.

FIG. 1 shows the structure of a typical graphic digitizing tablet. In the figure, reference numeral 1 denotes a tablet frame, reference numeral 2 denotes an outer flat electrode plate provided with a number of horizontally aligned strip electrodes, reference numeral 3 denotes an inner flat electrode plate provided with a number of vertically aligned strip electrodes, and reference numeral 4 denotes a pressure-sensitive, conductive elastic sheet interposed between the outer and inner flat electrode plates.

When some letters or figures are written on the tablet with a pen 5, since pressure is applied to the pressure-sensitive, conductive elastic sheet 4 via the outer flat electrode plate 2, the conductive elastic sheet 4 becomes conductive and, thereby, at least one of horizontal strip electrodes is electrically connected to at least one of vertical strip electrodes, so that the point of contact can be identified by its co-ordinates.

The graphics digitizing tablet thus constructed is often as big as 500 mm square. Accordingly, while the user writes letters or figures on the tablet, the heel of the user's hand 6 or the user's forearm 7 inevitably applies pressure to the surface of outer flat electrode plate 2, so that an unintentional position is detected and thereby erroneous operation often occurs.

In the prior-art pressure-sensitive, conductive elastic sheet, however, contact pressure under which the conductive elastic sheet 4 becomes conductive decreases with increasing contact area. Since the area of the hand or the forearm is greater than that of a pen tip, erroneous input occurs inevitably and readily.

Figure 2:
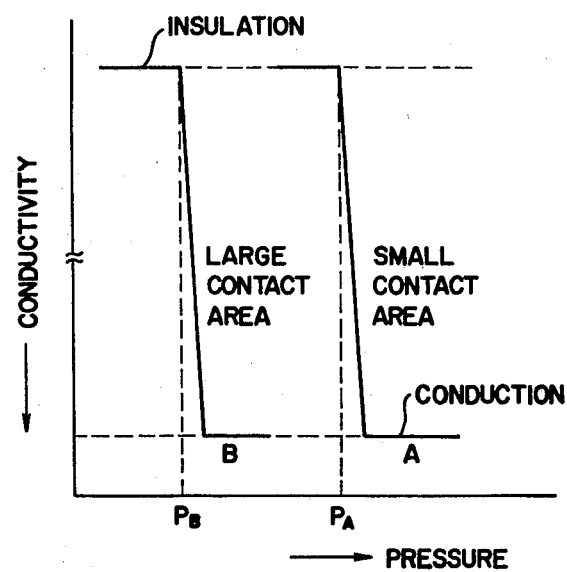
FIG. 2 is a graphical representation showing the relationships between conductivity and pressure in a typical prior-art pressure-sensitive, conductive elastic sheet.

FIG. 2 shows the relationships between conductivity and pressure applied to the tablet of a prior-art pressure-sensitive, conductive elastic sheet. As can be seen, when pressure applied to the sheet by a pen reaches a value $P_A$, the conductivity of the sheet rises abruptly from insulative to conductive as designated by curve A. On the other hand, when pressure is applied to the sheet by something other than the pen, since its area is usually greater than that of the pen, the conductivity of the sheet rises abruptly from insulative to conductive at a value $P_B$ less than $P_A$ as designated by curve B. That is to say, the greater the contact area, the higher the pressure sensitivity of the conductive sheet.

Although the relationships between contact pressure and contact area of the prior-art pressure-sensitive, conductive elastic sheet will be explained hereinafter with reference to FIG. 4 in conjunction with the conductive sheet according to the present invention, the contact pressure $P_A$ is approximately 50 g/mm$^2$ when the contact area is 1 mm$^2$; however, the contact pressure $P_B$ is approximately 25 g/mm$^2$ when the contact area is 50 mm$^2$. That is to say, if the area of the heel of the user's hand is 50 times larger than that of a pen, erroneous input occurs when approximately half of the pen pressure is applied to the pressure-sensitive sheet.

The conductive elastic sheet conventionally includes conductive metal particles uniformly dispersed in a rubber material microscopically spaced from each other. Therefore, when pressure is applied to the sheet, since the rubber material is compressed and deformed, particles are brought into contact with other particles at the point where pressure is applied. Since the conductive metal particles dispersed on the surface of the sheet are in contact with the strip electrodes of the outer and inner flat electrode plates when pressure is applied to the surface of the sheet, the two electrode plates are brought into contact with each other via the pressure-sensitive elastic sheet.

It is very difficult to explain clearly why pressure sensitivity increases with increasing contact area; however, it may be due to the following causes:

(1) variations in the size and the distribution of conductive metal particles in the conductive sheet;

(2) variations in the modulus of elasticity of the conductive sheet;

(3) variations in the distance between the conductive sheet surface and the outermost metal particles in the conductive sheet; and (4) variations in the thickness of the conductive sheet.

The increase in pressure sensitivity with respect to increasing contact area may be caused by other complicated factors in combination with the above-mentioned reasons; however, it is possible to simply consider that the greater the variations in different conduction factors, the higher the probability of contact between metal particles. In other words, the greater the variation in various conduction factors, the greater the number of points with a relatively low contact pressure.

In order to solve the above-mentioned problem, a method of normalizing the distribution of metal particles has already been proposed, in which the metal particles with diameters as small as possible are mixed with a rubber material in a higher concentration. In such prior-art, pressure-sensitive, conductive elastic sheet, although it is possible to manufacture a conductive sheet in which particles are dispersed uniformly, the working life time is not sufficiently long. This is because the high concentration of fine metal particles exerts a harmful influence upon the characteristics of the rubber with respect to fatigue and abrasion resistance. Therefore, the life time of the prior-art conductive sheet by which a sufficient pressure sensitivity and proper sheet thickness can be maintained is as short as one thousand cycles, in the case where metal particles with a diameter of 10 micron or less are used. Additionally, there exists another conductive sheet in which fine insulating particle layers are formed in order to increase the life time; however, the pressure sensitivity is too low for practical use.

In view of the above description, reference is now made to an embodiment of the pressure-sensitive, conductive elastic sheet according to the present invention.

Figure 3:
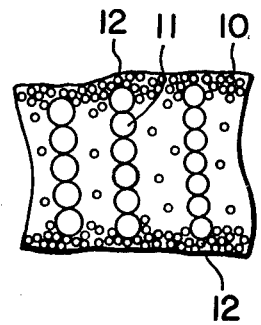
FIG. 3 is an enlarged cross-sectional view of the pressure-sensitive, conductive elastic sheet according to the present invention, in which coarse and fine ferromagnetic, conductive metal particles are shown in an exaggerated scale.

FIG. 3 shows the microscopic structure of the conductive sheet. In the figure, reference numeral 10 denotes liquid elastomer such as silicon rubber, reference numeral 11 denotes coarse, ferromagnetic, conductive metal particles, and reference numeral 12 denotes fine, ferromagnetic, conductive metal particles. The material of both the coarse and fine particles is ferrite or carbonic nickel.

The average diameter of the coarse, ferromagnetic, metal particles 11 ranges from 30 to 150 microns; the average diameter of the fine, ferromagnetic, metal particles is less than 50 microns.

The mixture ratio by weight of the coarse particles to the fine particles is from 1:1 to 1:0.1 in the case where the fine particles with a diameter of about 10 micron or less are used and is about 1:2 to 1:5 in the case where the fine particles with a diameter of about 50 micron or less are used.

The mixture ratio by weight of the elastomer to the combined coarse and fine particles is from 1:0.5 to 1:0.8.

In order to arrange the coarse, ferromagnetic, conductive metal particles in the interior of the conductive sheet and to disperse the fine, ferromagnetic, conductive metal particles at the two outer surfaces of the conductive sheet, first, the coarse metal particles are mixed with a liquid elastomer; secondly, the mixed material is formed into an inner sheet within a uniform magnetic field; thirdly, the fine particles are mixed with another liquid elastomer; fourthly, the liquid elastomer including fine ferromagnetic conductive metal particles is laminated onto both of the surfaces of the inner sheet in such a way that the thickness of the outer laminated elastomer is less than that of the inner sheet.

In order to arrange the coarse ferromagnetic, conductive metal particles through the interior of the conductive sheet and to disperse the fine, ferromagnetic conductive metal particles on one outer surface of the conductive sheet, first, the coarse particles are coated with a low-molecular-weight elastomer; secondly, the coated coarse particles are mixed with the fine particles in a liquid elastomer; thirdly, the mixed coarse and fine particles are allowed to set within a uniform magnetic field for a predetermined time period. In this method, the differences in sedimentation velocity and agglutination rate between the coarse and fine particles ensure formation of a conductive sheet in which the fine particles are concentrated on one surface thereof.

The application of the uniform magnetic field to the particle-elastomer mixture during setting causes the coarse metal particles to align vertically through the sheet, as shown in FIG. 3. As a result, the inner sheet is much more pressure-sensitive than if the coarse particles were randomly distributed. This allows suitable pressure-sensitivity without the damaging effects of excessive particle content.

In the conductive sheet according to the present invention, the choices of the diameters of the coarse and fine ferromagnetic metal particles and the mixture ratios of the coarse and fine ferromagnetic metal particles and elastomer are very important in order to obtain optimal relationships between the contact pressure and contact area. In particular, the mixture ratio $R_M$ of the coarse to fine ferromagnetic metal particles has a great influence upon the characteristics between contact pressure and contact area. The greater the mixture ratio $R_M$, the greater the contact pressure with respect to a constant contact area.

Various experiments have been made to determine the above-mentioned particle diameters and mixture ratios and the following values have been determined for desirable characteristics in which the contact pressure is almost constant irrespective of contact area or increases with increasing contact area.

(1) The diameter of the coarse ferromagnetic metal particles is from 30 to 150 micron;

(2) The diameter of the fine ferromagnetic metal particles is classified into two groups of 10 micron or less and 50 micron or less;

(3) The mixture ratio of the coarse ferromagnetic metal particles to the fine ferromagnetic metal particles if from 1:0.1 to 1:1 by weight in the case of the fine ferromagnetic metal particles with a diameter of 10 micron or less and is from 1:2 to 1:5 in the case of the fine ferromagnetic metal particles with a diameter of 50 micron or less; and (4) The mixture ratio of the coarse and fine ferromagnetic metal particles to the elastomer is from 1:0.5 to 1:0.8 by weight.

Figure 4:
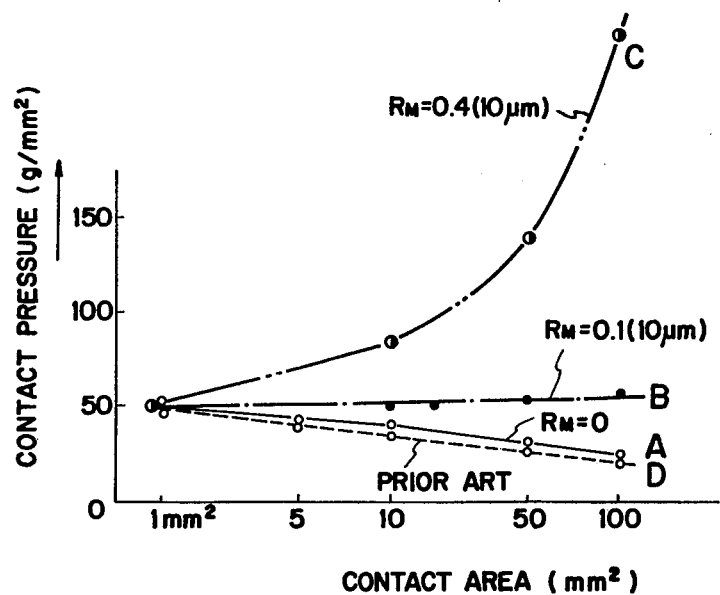
FIG. 4 is a graphical representation of the relationships between contact pressure and contact area in each of the embodiments of the pressure-sensitive, conductive elastic sheets according to the present inventions, including that of a typical prior-art pressure-sensitive, conductive elastic sheet.

FIG. 4 shows exemplary relationships between contact pressure and contact area. In the figure, the curve A traces the characteristics obtained when the mixture ratio $R_M$ of the coarse to fine ferromagnetic metal particles is zero, that is, when there are no fine particles, which are almost the same as those of a prior-art pressure sensitive conductive sheet illustrated by curve D.

The curve B shows the characteristics obtained when the mixture ratio $R_M$ of coarse to fine ferromagnetic metal particles is 1:0.1 in the case where the fine ferromagnetic metal particles with a diameter of 10 micron or less are used or when the $R_M$ is 1:2 in the case where the fine particles of 50 micron or less are used.

The curve C shows the characteristics obtained when the mixture ratio $R_M$ of coarse to fine ferromagnetic metal particles is 1:0.4 in the case where the fine ferromagnetic metal particles with a diameter of 50 micron or less are used or when the $R_M$ is 1:4 in the case where the fine particles of 50 micron or less are used.

As explained with reference to FIG. 4, it is possible to obtain desirable characteristics between contact pressure and contact area by controlling the mixture ratio of coarse to fine ferromagnetic metal particles at a predetermined value and by aligning the coarse, conductive, ferromagnetic metal particles through the interior of the conductive sheet and dispersing the fine, conductive, ferromagnetic metal particles in at least one outer surface of the conductive sheet.

It is not easy to explain the above-mentioned effect; however, it may be due to the following reasons:

(1) since a great number of fine particles are dispersed near the surface of the conductive sheet, the hardness of the sheet surface is high and additionally more uniform over a wider contact area than that of the interior of the sheet. Therefore, more uniform pressure is required to bring the fine particles into contact with each other completely throughout the conduction area, thus preventing local conduction. As a result, the sheet can be easily rendered conductive by a pen tip with a small contact area but not by a hand with a large contact area. This phenomenon can more readily be understood by imagining a model in which a relatively hard plastic sheet is placed on plastic foam. In this case, although it is easy to contact the hard sheet through the foamed plastic in a small area, it is difficult to compress the foamed plastic over a large area.

(2) since the diameter of the fine particles is small, the electrical contact resistance between particles is large. Therefore, the phenomenon described under (1) above is additionally emphasized.

Therefore, the higher the mixture ratio $R_M$ of the coarse to fine ferromagnetic metal particles, the higher the contact pressure required over the contact area. Additionally, the larger the contact area, the higher the contact pressure required with the mixture ratio $R_M$ at a constant value.

As opposed to the prior-art conductive sheet in which there is a high probability of contact between metal particles at local positions in the contact area, in the conductive sheet according to the present invention, since the variations in various conduction factors are small, a more uniform pressure is required to make the sheet conductive. Furthermore, since the hardness of the sheet surface is high, a relatively high pressure is required to make a large conduction area conductive.

In the case where the pressure-sensitive, conductive elastic sheet according to the present invention is applied to a 200 mm square tablet, the tablet can detect contact when a letter is written with a ballpoint pen (small contact area of 10 mm² or less), but cannot detect pressure due to contact with the heel of user's hand or the user's forearm (larage contact area).

Furthermore, in this embodiment described above, the elasticity of the sheet is almost the same as in the prior-art rubber conductive sheet, because the fine ferromagnetic metal particles are concentrated near the surface of the sheet and the coarse ferromagnetic metal particles are arranged in the interior of the sheet.

As described above, in the pressure-sensitive, conductive elastic sheet according to the present invention, since the coarse ferromagnetic metal particles and the fine ferromagnetic metal particles are first mixed at a predetermined ratio and next mixed with liquid elastomer and since the elastomer including the particles is formed into a sheet within a uniform magnetic field, the coarse ferromagnetic metal particles can be aligned in the direction perpendicular to the plane of the sheet and additionally the fine ferromagnetic metal particles can be dispersed near one surface or near both surfaces of the conductive sheet. Therefore, it is possible to provide a pressure-sensitive, conductive elastic sheet in which the contact pressure is constant irrespective of the contact area or the contact pressure increases with increasing contact area.

Furthermore, when the pressure-sensitive, conductive elastic sheet is applied to a graphics digitizing tablet through which various letters or figures can be detected by a character reader, it is possible to provide a tablet which is sensitive only to, for instance, a pencil or a ballpoint pen with a small contact area and not sensitive to, for instance, the heel of the user's hand or the user's forearm, which have a large contact area.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A pressure-sensitive, conductive elastic sheet, which comprises:
   (a) coarse ferromagnetic conductive particles of from 30 to 150 microns in diameter;
   (b) fine ferromagnetic conductive particles of 10 microns or less in diameter, said fine particles being mixed with said coarse particles at a mixture ratio of from 1:0.1 to 1:1 by weight; and
   (c) elastomer mixed with said coarse and fine particles at a mixture ratio of from 1:0.5 to 1:0.8 by weight, said coarse ferromagnetic particles being aligned in the direction perpendicular to the plane of the sheet through the interior thereof and said fine ferromagnetic particles being dispersed near at least one surface thereof,
   whereby the pressure at which an electrically conductive pathway is formed through the sheet is almost constant irrespective of contact area to which pressure is applied or increases with increasing contact area.

2. A pressure-sensitive, conductive elastic sheet as set forth in claim 1, wherein said coarse and fine particles are ferrite.

3. A pressure-sensitive, conductive elastic sheet as set forth in claim 1, wherein said coarse and fine particles are carbonic nickel.

4. A pressure-sensitive, conductive elastic sheet as set forth in claim 1, wherein said elastomer is silicon rubber.

5. A pressure-sensitive, conductive elastic sheet, which comprises:
   (a) coarse ferromagnetic conductive particles of from 30 to 150 microns in diameter;
   (b) fine ferromagnetic conductive particles of 10 microns or less in diameter, said fine particles being mixed with said coarse particles at a mixture ratio of from 1:2 to 1:5 by weight; and
   (c) elastomer mixed with said coarse and fine particles at a mixture ratio of from 1:0.5 to 1:0.8 by weight, said coarse ferromagnetic particles being aligned in the direction perpendicular to the plane of the sheet through the interior thereof and said fine ferromagnetic particles being dispersed near at least one surface thereof,
   whereby the pressure at which an electrically conductive pathway is formed through the sheet is almost constant irrespective of contact area to which pressure is applied or increases with increasing contact area.

6. A pressure-sensitive, conductive elastic sheet as set forth in claim 5, wherein said coarse and fine particles are ferrite.

7. A pressure-sensitive, conductive elastic sheet as set forth in claim 5, wherein said coarse and fine particles are carbonic nickel.

8. A pressure-sensitive, conductive elastic sheet as set forth in claim 5, wherein said elastomer is silicon rubber.

9. A method of forming a pressure-sensitive conductive elastic sheet in which the pressure at which the sheet is rendered conductive is almost constant irrespective of contact area or increases with increasing contact area, which comprises the following steps of:
   (a) mixing coarse ferromagnetic conductive particles of from 30 to 150 microns in diameter with a liquid elastomer;
   (b) allowing the liquid elastomer mixed with said coarse particles to solidify into an inner sheet within a uniform magnetic field;
   (c) mixing fine conductive particles of 50 microns or less in diameter with a liquid elastomer; and
   (d) laminating the liquid elastomer including said fine particles onto both of the surfaces of said inner sheet, the laminated elastomer being thinner than said inner sheet.

10. A method of forming a pressure-sensitive, conductive elastic sheet in which the pressure at which the sheet is rendered conductive is almost constant irrespective of contact area or increases with increasing contact area, which comprises the following steps of:
   (a) coating coarse ferromagnetic conductive particles of from 30 to 150 microns in diameter with a low-molecular-weight elastomer;
   (b) mixing the coated coarse particles with a liquid elastomer in which fine conductive particles of 50 microns or less in diameter have been mixed; and
   (c) leaving the elastomer including the coated coarse and fine particles, in the form of a sheet, within a uniform magnetic field for a predetermined time sufficiently long to allow the fine ferromagnetic particles to collect on the bottom surface thereof.

* * * * *